(12) United States Patent
van Klink et al.

(10) Patent No.: US 11,447,635 B2
(45) Date of Patent: Sep. 20, 2022

(54) ASPHALT COMPOSITION COMPRISING HUMINS OBTAINED FROM DEHYDRATION OF CARBOHYDRATES

(71) Applicant: Avantium Knowledge Centre B.V., Amsterdam (NL)

(72) Inventors: Gerardus Petrus Maria van Klink, Amsterdam (NL); Edserd De Jong, Amsterdam (NL)

(73) Assignee: Furanix Technologies B.V., Amsterdam (NL)

( * ) Notice: Subject to any disclaimer, the term of this patent is extended or adjusted under 35 U.S.C. 154(b) by 437 days.

(21) Appl. No.: 16/477,045

(22) PCT Filed: Jan. 16, 2018

(86) PCT No.: PCT/NL2018/050031
§ 371 (c)(1),
(2) Date: Jul. 10, 2019

(87) PCT Pub. No.: WO2018/135941
PCT Pub. Date: Jul. 26, 2018

(65) Prior Publication Data
US 2019/0338127 A1    Nov. 7, 2019

(30) Foreign Application Priority Data

Jan. 17, 2017 (NL) .................................. 2018186

(51) Int. Cl.
*C08L 95/00* (2006.01)
*C08L 97/00* (2006.01)

(52) U.S. Cl.
CPC ............. *C08L 95/00* (2013.01); *C08L 97/005* (2013.01); *C08L 2555/34* (2013.01); *C08L 2555/40* (2013.01)

(58) Field of Classification Search
None
See application file for complete search history.

(56) References Cited

U.S. PATENT DOCUMENTS

| | | | |
|---|---|---|---|
| 1,988,543 | A | 1/1935 | Daimler |
| 2,008,978 | A | 7/1935 | Daimler |
| 2,102,480 | A | 12/1937 | Nielsen |
| 3,293,200 | A | 12/1966 | MacGregor |
| 2006/0292366 | A1 | 12/2006 | Schneider |
| 2013/0172628 | A1 | 7/2013 | Berlin et al. |

FOREIGN PATENT DOCUMENTS

| | | |
|---|---|---|
| CN | 105985654 A | 10/2016 |
| DE | 3621517 A1 | 1/1988 |
| EP | 2741606 A1 | 6/2014 |
| GB | 351094 | 12/1929 |
| GB | 381933 A | 9/1932 |
| GB | 448814 | 6/1936 |
| SU | 1661184 A1 | 7/1991 |
| WO | WO 2007/104514 A2 | 9/2007 |
| WO | WO 2007/104515 A1 | 9/2007 |
| WO | WO 2013/022752 A1 | 2/2013 |

OTHER PUBLICATIONS

Anonymous, "Humic acid—Wikipedia", Aug. 27, 2017 (Aug. 27, 2017), p. 1-7, Retrieved from the Internet: URL:https://en.wikipedia.org/wiki/Humic_acid.

Anonymous, "Humin—Wikipedia", Jun. 16, 2017 (Jun. 16, 2017), p. 1-2, Retrieved from the Internet: URL:https://en.wikipedia.org/wiki/Humin.

Hänninen, Kari, "Historical and Current Progress in Understanding the Origin and Structure of Humic Substances", Chemistry and Ecology ,vol. 26, No. sup2, Oct. 1, 2010 (Oct. 1, 2010), p. 1-11, XP055411209; DOI: 10.1080/02757540.2010.494158 external link ISSN:0275-7540; pp. 1-19.

Herzfeld, Judith et al, "Molecular Structure of Humin and Melanoidin via Solid State NMR", Journal of Physical Chemistry Part B: Condensed Matter, Materials, Surfaces, Interfaces & Biophysical,vol. 115, No. 19, May 19, 2011 (May 19, 2011), p. 5741-5745, XP055411103; DOI: 10.1021/jp1119662 external link; ISSN:1520-610.

Susic, Michael, "A History of Humic Acid Research More Than Two Centuries of Humic Acid Research—Why So Long?", Jun. 10, 2008 (Jun. 10, 2008), p. 1-15, Retrieved from the Internet: URL:https://humicacid.wordpress.com/a-history-of-humic-acid-research/.

Susic, Michael, "Humic Acid, Structure and Origin of Humic Acids and Their Relationship to Kerogen, Bitumen, Petroleum and Coal", Dec. 6, 2003 (Dec. 6, 2003), p. 1-33, Retrieved from the Internet: URL:https://humicacid.wordpress.com/structure-and-origin-of-humic-acids-and- their-relationship-to-kerogen-bitumen-petroleum-and-coal/.

Van Zandvoort, Ilona et al, "Formation, Molecular Structure, and Morphology of Humins in Biomass Conversion: Influence of Feedstock and Processing Conditions", Chemsuschem,vol. 6, No. 9, Sep. 8, 2013 (Sep. 8, 2013), p. 1745-1758, XP055289214; DOI: 10.1002/cssc.201300332 external link ISSN:1864-5631.

*Primary Examiner* — Colin W. Slifka
(74) *Attorney, Agent, or Firm* — Hoffmann & Baron, LLP

(57) ABSTRACT

An asphalt composition comprising aggregates and a binder material, wherein the binder material comprises humins, which humins comprise carbonaceous water-insoluble by-products of the dehydration of carbohydrates and/or 5-hydroxymethylfurfural and/or ethers or esters of 5-hydroxymethylfurfural. The invention also provides a binder material for use in asphalt compositions comprising from 1 to 95% wt, preferably from 5 to 60% wt of such humins, based on the weight of the binder material. The invention further provides for the use of such humins in the manufacture of binder material for asphalt compositions and the use of such humins as binder material in asphalt compositions.

14 Claims, No Drawings

ASPHALT COMPOSITION COMPRISING HUMINS OBTAINED FROM DEHYDRATION OF CARBOHYDRATES

CROSS-REFERENCE TO RELATED APPLICATIONS

This application is the National Stage of International Application No. PCT/NL2018/050031, filed Jan. 16, 2018, which claims the benefit of Netherlands Application No. NL 2018186, filed Jan. 17, 2017, the contents of which is incorporated by reference herein.

FIELD OF THE INVENTION

The present invention relates to asphalt compositions, in particular to asphalt compositions that comprise sustainable components that form a binder material for such asphalt compositions.

BACKGROUND TO THE INVENTION

By asphalt compositions in this specification is understood the combination comprising a binder material and aggregates.

Roads tend to age and when aged roads are being renewed, large quantities of reclaimed asphalt become available. From an environmental standpoint it is undesirable to dump the reclaimed asphalt as waste. Therefore, there is an increasing desire to recycle reclaimed asphalt. Although the reclaiming of asphalt reduces the carbon footprint of asphalt, it is even more desirable to use renewable material in asphalt, even if it were only part of the asphalt. The renewable material may be used together with bitumen obtained from reclaiming asphalt, thereby increasing the environmental acceptability even further.

By a renewable material is herein understood a composition of matter of biological origin, such as carbohydrates, as opposed to a composition of matter obtained or derived from fossil sources such as petroleum, natural gas, peat or coal.

In Tang, Sheng, "Asphalt modification by utilizing bio-oil ESP and tall oil additive" (2010). *Graduate Theses and Dissertations*. Paper 11569, Iowa State University, it has been proposed to employ the oil that is obtained in the pyrolysis of biomass as additive to bitumen. Such an oil typically contains inter alia lignin degradation products, carbohydrate derived compounds and water. Lignins can be described as amorphous three-dimensional network polymers comprised of phenylpropane units that link together in different ways. It is known for its anti-oxidative properties. Lignin-containing oils can therefore be used as antioxidant additive in asphalt compositions. Thereto, it has been proposed to add up to about 9% wt of such oil to bitumen binder material.

In Kowalski et al., Transportation Research Procedia, 14 (2016) 3582-3591, an overview of attempts to make asphalt more sustainable has been presented. It mentions an increased use of reclaimed asphalt. It also describes that second-generation bioethanol production from lignocellulosic biomasses may result in a lignin by-product for which an outlet is sought. A typical outlet is obtained by pressing lignin into pellets for producing heat, e.g., for the bioethanol production process itself. The journal article describes experiments wherein lignin was added in various quantities to bitumen. It was concluded that lignin was suitable for addition to bitumen to partially replace styrene-butadiene-styrene (SBS) polymer. The main advantage would be an appreciable cost reduction in the final binder.

It would be advantageous if bitumen could be replaced, preferably in its entirety, but also suitably for a fraction, by a renewable source, which not only would have an effect on the price of the final binder material, but also exert an advantageous effect on the performance of the resulting asphalt composition.

SUMMARY OF THE INVENTION

It has now surprisingly been found that the use of humins, suitably obtained during dehydration of carbohydrates and/or 5-hydroxymethylfurfural and/or ethers or esters of 5-hydroxymethylfurfural, as binder material in asphalt compositions has a beneficial effect against cracking of road pavement using such asphalt and on the water sensitivity thereof.

Accordingly, the present invention provides an asphalt composition comprising aggregates and a binder material, wherein the binder material comprises humins, which humins comprise carbonaceous water-insoluble by-products of the dehydration of carbohydrates and/or 5-hydroxymethylfurfural and/or ethers or esters of 5-hydroxymethylfurfural.

It has been found that the tensile strength properties of such asphalt compositions are surprisingly good. In many instances the tensile strength properties of such compositions is higher than such properties of comparable conventional asphalt compositions or asphalt compositions that comprise lignin. The tensile properties are of interest to pavement engineers as these properties have an effect on the cracking behavior of a pavement. The indirect tensile strength test is used to determine the tensile properties of the asphalt compositions. These properties can be related to the cracking behavior of the resulting pavement. Low temperature cracking, fatigue and rutting are three major distress mechanisms. A higher tensile strength corresponds with a stronger resistance against cracking.

Another important parameter for road pavement is its sensibility to moisture. When a road pavement is exposed to moisture the tensile strength tends to decrease. In an indirect tensile strength ratio the tensile strength of a wet pavement is compared with the tensile strength of the dry pavement. It is important that the tensile strength of the pavement is retained to a sufficiently high level. The higher the ratio is, the better the resistance to moisture-induced deterioration of the tensile properties is. However, the absolute level of the tensile strength is of paramount importance. A potential manner of measuring the moisture sensitivity is by means of measurement of the swelling of the asphalt. The less the pavement swells under influence of moisture the more consistently the pavement performs under dry or wet conditions. It appeared that the humins-containing asphalt compositions show excellent resistance to moisture-induced damage.

DETAILED DESCRIPTION OF THE INVENTION

Humins constitute a known material. A chemically skilled person will be aware that the term humins can be used to refer to a certain class of organic compounds that, at least at room temperature, are essentially insoluble in water at all pH's. The term humins is used in two related contexts, in soil chemistry and sugar chemistry.

Although the term "humins" is used for both soil-derived humins as well as sugar-derived humins, the humins itself are actually quite different.

In the thesis of I. van Zandvoort, titled "Towards the valorization of humin by-products", published by the University of Utrecht, the Netherlands in 2015 (ISBN: 978-90-393-6291-4), it is explained that the soil-derived humin or humus fractions are expected to have a more complex structure than the humin by-products formed during acid catalyzed dehydration of sugars. For example, due to the incorporation of fatty acids, amino acids, lignin and inorganic materials, the soil-derived humins will have a higher nitrogen content than the humins obtained by means of a chemical, catalytical dehydration process of sugars.

In addition, without wishing to be bound by any kind of theory, soil-derived humins are believed to be more attractive to fungi and molds and hence more prone to molding, whereas humins obtained during dehydration of carbohydrates and/or 5-hydroxymethylfurfural and/or ethers or esters of 5-hydroxymethylfurfural, can be used for a prolonged time, suitably weeks, months or even years, without molding.

Sugars are herein also referred to as carbohydrates. The humins described in this specification can advantageously be obtained during dehydration of carbohydrates and/or 5-hydroxymethylfurfural and/or ethers or esters of 5-hydroxymethylfurfural. That is, the humins described in this specification are advantageously derivable from a renewable source. As explained above, as a result the humins in the present specification are quite different from so-called soil-derived humins, such as the soil-derived humins extracted from, for example, peat and used for road covering as described in for example U.S. Pat. No. 2,102,480. Whilst such soil-derived humins in U.S. Pat. No. 2,102,480 are obtained from a fossil source, such as peat, the humins in the current specification can suitably be produced during the dehydration of carbohydrates, a renewable source.

Humins have also been mentioned in U.S. Pat. No. 3,293,200, describing thermosetting adhesive compositions that are useful in the manufacture of plywood and contain, as essential ingredients, a water-soluble phenol-aldehyde resin and a water-insoluble, finely-divided humins material obtained from the manufacture of levulinic acid by acid hydrolysis of lignocellulose, i.e. a natural product comprising a combination of carbohydrates and lignin. Although various procedures are known for the manufacture of levulinic acid from lignocellulose, the reaction generally is carried out under severe acid hydrolysis conditions at a temperature in excess of 150° C., usually between 170° C. and 210° C. in the presence of a strong acid catalyst. During the reaction, humins material is formed as a result of an acid-catalyzed breakdown of lignocelluloses. Products include hexosans but also macromolecules containing amongst others furfural and hydroxymethyl furfural moieties. Such macromolecules are also referred to as humins. The remaining material comprises thus lignin components and humins. The hexosans are converted to the desired levulinic acid.

Humins have further been obtained in the dehydration of carbohydrates in the manufacture of levulinic acid, 5-hydroxymethylfurfural and/or 5-alkoxymethylfurfural and/or acyloxymethyl-furfural. Humins are also formed in the conversion of 5-hydroxymethylfurfural to levulinic acid and formic acid (conform G. Tsilomelekis et al., Green Chem., 2016, 18, 1983-1993). An example of such a dehydration reaction of carbohydrates is described in DE 3621517.

Preferred humins-producing processes are the processes described in WO 2007/104514 describing the preparation of 5-alkoxymethylfurfural from a fructose- or glucose-containing starting material, and WO 2007/104515, disclosing the preparation of 5-acyloxymethylfurfural from such a starting material. Although the latter processes have set out to reduce the yield of humins, the processes unavoidably yield amounts of humins for which a useful outlet is sought.

The humins in this specification have preferably been produced by the conversion of fructose, glucose or a mixture of glucose and fructose in the presence of water, an alcohol or a carboxylic acid, preferably at a temperature in the range of 105 to 250° C. More preferably the humins have been produced by reacting a fructose-containing starting material, a glucose-containing starting material and/or a fructose-glucose mixture-containing starting material with or in an alcohol in the presence of a catalytic or sub-stoichiometric amount of a heterogeneous acid catalyst, preferably at a temperature in the range of 105 to 250° C. Such a conversion may suitably result in the dehydration of the fructose and/or glucose, generating the humins. The alcohol, may suitably be selected from the group consisting of primary (un) branched aliphatic alcohols, preferably C1-05 primary unbranched aliphatic alcohols, more preferably methanol, ethanol, 1-propanol, iso-propanol, 1-butanol, most preferably methanol, ethanol, more particular preferably ethanol or mixtures thereof. Such processes are for example described in the above WO 2007/104514 and WO 2007/104515 and for more details reference is made to WO 2007/104514 and WO 2007/104515. The humins produced by the conversion of fructose, glucose or a mixture of glucose and fructose in the presence of an alcohol were found to have an advantageous stickiness, making such humins very suitable for use in an asphalt composition as described herein. Most preferably, the humins in this specification comprise carbonaceous water-insoluble by-products of the dehydration of carbohydrates in the presence of an alcohol, preferably methanol, ethanol, 1-propanol, iso-propanol, 1-butanol or a mixture thereof.

In this specification the humins preferably consist of carbonaceous water-insoluble by-products of the dehydration of carbohydrates and/or 5-hydroxymethylfurfural and/ or ethers or esters of 5-hydroxymethylfurfural. More preferably such a dehydration is an acid-catalyzed dehydration. Without wishing to be bound by any kind of theory, it is believed that these tend to be so-called colored bodies. They are believed to be polymers containing moieties from 5-hydroxymethylfurfural, furfural, residual carbohydrate and levulinic acid. These colored bodies are amongst others also produced as by-products in the partial degradation of carbohydrates by heat or other processing conditions, as described in e.g. EP 338151. The molecular structure of humins may vary, depending on the feedstock and solvent or solvent mixture used, if any, and the process conditions applied and is not yet unequivocally established. Humins are believed to be macromolecules containing amongst others furfural and hydroxymethyl furfural moieties. Further moieties that may be included in humins are carbohydrate, levulinate and alkoxymethyl furfural groups. A mechanism for the formation of humins molecules may contain several reaction paths, including polycondensation pathways, leading to a network of furan rings linked by ether and acetal bonds. Hence, suitably the humins may comprise a network of furan rings linked by ether and acetal bonds. A structure for humins is presented in I. van Zandvoort et al. ChemSusChem, 2013, 6, 1745-1758. In this journal article the humins structure is proposed for humins obtained in the acid-catalyzed dehydration of carbohydrates, such as fructose, glucose or xylose. The proposed structure is characterized by furan rings connected via alkylene moieties. It was found that the NMR spectra of these humins are very similar to other types of humins, all comprising furanic units linked with methylene groups. Thus, preferably the humins have a structure characterized by furan rings connected via alkylene moieties, such as methylene and ethylene groups. In addition other constituent groups may be hydroxyl, aldehyde, ketone, ether, carboxylic acid and ester groups. When the dehydration of the carbohydrates into furan derivatives is carried out in the presence of an organic solvent other functional groups, such as alkoxy and alkyl ester groups, will be present.

Humins may also be characterized with reference to the Van Krevelen diagram. In such a diagram the hydrogen index, i.e. the atomic hydrogen:carbon ratio, and the oxygen index, i.e. the atomic oxygen:carbon ratio, are plotted against each other. It was found that humins suitably have an oxygen:carbon atomic ratio in the range of 0.30 to 0.70, preferably from 0.40 to 0.60 and a hydrogen:carbon atomic ratio in the range of 0.60 to 1.6, preferably from 0.80 to 1.40. As indicated, in this specification humins are in particular water insoluble by-products that have been obtained from the acid-catalyzed dehydration of carbohydrates, such as cellulose, starch, sugars such as glucose, fructose and combinations thereof. Most preferably the carbohydrates are sugars. Such dehydration processes are suitably used for the conversion of carbohydrates to levulinic acid or esters thereof, or 5-hydroxymethylfurfural or ethers or esters thereof. Such processes have i.a. been described in the above-mentioned patent documents DE 3621517, WO 2007/104514 and WO 2007/104515.

By asphalt compositions in this specification is understood the combination comprising a binder material and aggregates. Asphalt compositions are widely used in road pavements and similar applications. The aggregates in asphalt compositions that are used in road pavements are sometimes divided by asphalt manufacturers in three categories; a fine fraction that has a diameter smaller than 63 µm, an intermediate fraction with a diameter in the range of 63 µm to 2 mm, and a coarse fraction having a diameter greater than 2 mm. The largest aggregates typically do not have a maximum diameter that exceeds 32 mm.

Asphalt compositions are widely used for road pavements. Conventional asphalt from a road pavement may generally contain from 3 to 10% wt (percentage by weight), more generally 4 to 6% wt bitumen as binder material. The aggregates are mixed together with the bitumen, spread and compacted, usually while being hot, to form a road pavement.

The humins that are used in the asphalt compositions according to the present invention have suitably properties that to some extent mimic the properties of bitumen. It is preferable to use humins that have a penetration value, determined according to EN 1426 (at 25° C., at a load of 100 g and for 5 s) of at most 90 dmm. Suitably, the humins have a penetration value of at least 10 dmm. In particular, the penetration values of the humins are in the range of 10 to 70 dmm.

The humins that are obtained in the dehydration of carbohydrates may form foams. Such has been described in co-pending application PCT/NL2016/050742. Foaming is obtained by heating a humins-containing starting material to a temperature in the range of 150 to 450° C., in particular by heating such starting materials to temperatures in the range of 170 to 410° C., more preferably from 180 to 350° C. It has been found that by subjecting the humins to a heat setting treatment of up to a temperature of less than 250° C. the humins tend to become more consistent. In this way the penetration value can be adjusted to lower values, if such would be preferred. The heat-set humins also show a great tensile strength and can advantageously be used in the asphalt compositions according to the invention. Although the humins may increase in volume and form a foam, the resultant product of the heat setting treatment can be ground or granulated in another way and granules obtained can be used in the asphalt compositions according to the invention.

Humins are different from lignin. Lignin is a complex polymer of phenyl-aromatic alcohols. It is commonly derived from wood and can be found in cell walls of plants. It is known as an adhesive in its natural state. Since dissolved lignin has some reactive groups that allow it to react with adhesive formulations, lignin has been employed in various wood adhesive formulations. Lignin is a cross-linked macromolecule which is relatively hydrophobic and aromatic in nature. The molecule consists of various types of substructures. The macromolecule is synthesized from various monomers, including p-coumaryl alcohol, coniferyl alcohol and sinapyl alcohol. The distribution of the monomers in lignin is dependent on plant species and tissues. However, typical structures for lignin are phenyl groups, hydroxyl and methoxy moieties and ether bonds.

Typical wood pulping processes which produce lignin include the sulphite, kraft and soda processes. In the latter processes wood is contacted with a sodium hydroxide solution and some other chemicals to facilitate the isolation of a lignin fraction. When wood pulping is carried out using the sulphite process, the lignin fraction is converted to ligno-sulphonates. In US 2006/0292366 a formulation for impregnating wood has been described wherein in addition to furfuryl alcohol and an acidic initiator, a water-soluble stabilizer, such as the calcium or ammonium salt of a lignosulphonic acid can be used. The most reactive lignins can be isolated from an organosolv process, in which wood is subjected to pulping using organic solvents such as ethanol and/or acetone. An organosolv process is described in e.g. US 2013/172628.

The use of humins has also the advantage that the asphalt compositions which are typically hot mix asphalt mixtures, do not need to be heated to very high temperatures as the softening of the humins takes place at a lower temperature than the softening of lignin/bitumen mixtures. Typically, a humins-containing binder material is heated to a temperature into the range of 120 to 200° C., preferably from 130 to 180° C., more preferably from 150 to 170° C., before it is mixed with the aggregates. In lieu of heating the humins-containing binder material or in addition to heating the binder material, it is also possible to heat the aggregates to a temperature in the above-mentioned range and mix the heated aggregates with the, optionally heated, binder material. The heated mixture of aggregates and binder material is suitably in the range of 120 to 200° C.

The asphalt compositions according to the invention comprise aggregates. As the skilled person realizes the term aggregate is the collective term denoting any mixture of particulates such as sand, gravel, crushed stones or cinders for pavement compositions. The aggregates are generally mineral material and may be composed of small sized rocks and pebbles, sand and finer dust of mineral material. Aggregates in pavement applications tend to have a variety of diameters. Aggregates may also be divided in different grades. As indicated above, they may be divided into a grade having diameters of less than 63 µm, another grade having diameters from 63 μm to 2 mm, and a further grade having diameters of greater than 2 mm. Typically, the coarser fraction of the latter grade may have particles with a diameter of up to 32 mm. The diameters of aggregates are typically determined by sieves. Standard sieves have been mentioned in standard EN 13043. In the present invention the diameters are determined by using the appropriate sieve in accordance with EN 13043. That means that aggregates with a diameter of at most 2 mm correspond with the fraction that passes a 2 mm sieve. The coarser fraction, i.e. particles with a diameter of more than 2 mm, is the fraction that does not pass the 2 mm sieve.

The binder material in the asphalt compositions according to the invention may consist of humins. That implies that the asphalt compositions of the invention may comprise a binder material that for 100% consists of humins, based on the binder material. Very good results have been obtained with binder materials that comprise from 1 to 100% wt of humins, preferably from 5 to 80% wt, more preferably from 20 to 60% wt of humins. By using another material in the binder composition, in addition to humins, favorable properties of such other material can also be introduced into the binder material and the eventual asphalt composition.

Preferably, the binder material comprises bitumen, in addition to humins. For example, the binder material can comprise from 1 to 90% wt of bitumen, based on the amount of humins and bitumen.

The bitumen used may be so-called virgin asphalt, which is used for the first time, but it may also comprise reclaimed asphalt. In practice, asphalt is already being reclaimed. In such a case typically lumps or pieces of reclaimed asphalt, that may optionally first be broken into granular pieces, are heated and mixed with fresh asphalt. Since the reclaimed asphalt comprises bitumen, the temperature to which the reclaimed asphalt may be heated is limited. If the temperature becomes too high the bitumen becomes sticky or even liquid so that the reclaimed asphalt will be difficult to handle or can even no longer be handled in an asphalt plant. Heating the reclaimed asphalt to such high temperature also results in a higher emission of volatile organic compounds (VOCs), and in more odors. Nevertheless, reclaiming of asphalt provides a very good outlet for existing asphalt compositions. It is also possible to reclaim the bitumen from existing asphalt. Reclaimed bitumen may be separated from existing asphalt lumps or pieces by crushing, or under the influence of impact, e.g. in a centrifugal mill, as disclosed in WO 2014/168479. The reclaimed bitumen can then be reused. In this way a new pavement composition can be obtained without the need for additional fossil feedstock. In this context it is observed that the bitumen may be relatively hard. When reclaimed bitumen is used, the reclaimed bitumen tends to be aged, and thus has a relatively high softening point and a relatively low penetration value. An advantage of the use of humins in binder material resides in that when bitumen is used as additional binder material component, humins may enable the use of relatively hard bitumen. Bitumen grades may be expressed by reference to their penetration values. In accordance with European Norm EN 12591 bitumen grades can be distinguished, e.g., as bitumen 20/30, 30/45, 35/50, 40/60, 50/70, 60/70 and 70/100, wherein the numbers indicate the penetration values (at 25° C., at a load of 100 g and for 5 s) as determined in accordance with EN 1426. Bitumen 70/100 is relatively soft. Therefore, when bitumen is a binder material component in addition to humins, the bitumen is suitably selected from the grades 20/30, 30/45, 35/50, 40/60, 50/70 and 60/70.

When reclaimed bitumen is used it may be advantageous to apply a rejuvenating agent. Such a rejuvenating agent may be added to the binder material. There is a myriad of products that are presently being used and marketed as rejuvenating agents. Such products are generally classified as flux oils, viscosity graded asphalt and a large variety of proprietary formulations. A potential rejuvenating agent is a shale oil modifier. Commonly used are crude oil fractions, preferably having a viscosity of at least 200 mm$^2$/s at 60° C., animal oils, vegetable oils and mixtures thereof. The use of relatively light crude oil fractions has an environmental drawback in that it evaporates and thus produces hydrocarbonaceous vapors that are undesirable from an environmental point of view. Therefore, the rejuvenating agent is preferably a vegetable oil, more preferably selected from soybean oil, sunflower oil, rapeseed oil, corn oil, peanut oil, olive oil, coconut oil, palm oil, palm kernel oil and mixtures thereof, more preferably palm oil or palm kernel oil. The use of such oils is more sustainable and since these oils show a low volatility, their use thus has a long-lasting effect on the asphalt.

The amount of bitumen in the binder material may vary. Suitably, the amount of bitumen in the binder material is in the range of 1 to 95% wt, based on the amounts of humins and bitumen. Amounts of bitumen below 1% wt fail to provide any significant influence on the performance of the binder material, whereas amounts beyond 95% wt of bitumen often show too little of the advantages that humins infer. Good results are obtainable with binder materials with a bitumen content in the range of 40 to 90% wt, based on the amounts of humins and bitumen.

If desirable, to the binder material various other components may be added. Such other materials include polymers that are often added to bitumen to obtain modified bitumen and modified asphalt compositions. In such a case the bitumen has been modified by the addition of one or more polymers. Such polymers may be elastomers, such as styrene butadiene rubber, styrene butadiene block copolymers, which may be linear or star-shaped; styrene isoprene block copolymers, which may be linear or star-shaped, and EPDM rubber (ethylene propylene diene monomer polymer). Alternatively, thermoplasts may be added, such as, polyvinyl chloride, ethylene-vinyl acetate; copolymers of ethylene and methyl or butyl (meth)acrylate, polyethylene or polypropylene which suitably is atactic.

Another component in the binder material may be lignin, in addition to humins. That is the binder material can suitably comprise lignin, in addition to humins. Lignin is also a natural sustainable source and is thus environmentally acceptable. Moreover, it is known that it may suitably be used in asphalt compositions. Accordingly, the binder material suitably comprises from 0.5 to 20% wt of lignin, in addition to humins. As the combination of lignin and bitumen is known, the binder material in the present asphalt compositions suitably comprises humins, bitumen and lignin. In such compositions, the content of humins is advantageously from 10 to 50% wt, the content of bitumen is advantageously from 10 to 70% wt and the content of lignin is advantageously from 5 to 20% wt, wherein the percentages are based on the amounts of humins, bitumen and lignin. That implies that the total of these percentages add up to 100% wt. Suitably, the weight ratio of humins to lignin is at most 1:2, preferably at most 1:1 and more preferably from 1:0.5. The minimum weight ratio of humins to lignin may be 1:0, but in practice may be 1:0.01. These weight ratios are preferred for any binder materials, including those that do not comprise bitumen.

In accordance with the present invention the asphalt compositions comprise aggregates and humins-containing binder material. These aggregates may have different sizes as indicated above. Typically when the asphalt composition is used as road pavement, it comprises fine aggregates and coarse aggregates. Such aggregates may be rocks, pebbles etc. with a diameter at greater than 2 mm as the coarse aggregates and sand with a diameter of smaller than 2 mm as fine aggregates. It is also possible to use the asphalt compositions according to the present invention as mastic compositions.

Preferably the asphalt composition comprises aggregates, wherein the aggregates comprise aggregates with a diameter of at most 2 mm. A mastic composition differs from road pavement compositions in that it contains substantially only aggregates with a diameter of at most 2 mm. It may be used in the preparation of road pavements, but it is also used as binder for pebbles and small sized rocks, and as sealant. The asphalt compositions are very suitably used as road pavement compositions. That includes e.g. asphalt concrete, stone mastic concrete, also known as stone mastic asphalt, dense asphaltic concrete, and open-graded asphalt, also known as porous asphalt, such as "very open asphalt concrete" (in Dutch the acronym ZOAB) which is similar to the US open-graded asphalt, known as Open-Graded Friction Course (OGFC). The open-graded asphalt provides a kind of porous pavement with improved water permeability and noise-suppression. It integrates a skeleton of aggregates with more or less uniform size with a minimum of fines. Due to the low content of fine aggregates a large number of air voids are produced, which results in an open structure with improved water permeability and reduction of noise. Stone mastic asphalt (SMA) provides a deformation-resistant, durable surfacing material. SMA has a relatively high content of coarse aggregate so that a stone skeleton is formed that has a good resistance to permanent deformation. The stone skeleton is filled with a mastic of binder material and filler to which fibers may be added. Typical SMA compositions comprise 5 to 8, generally 6 to 7% wt of binder material, based on SMA.

It is emphasized that the asphalt compositions according to the present invention may be used for applications different from road pavement. Such applications include roof feltings and sealants, floorings, e.g. in industrial buildings or play parks or tennis courts, and drilling fluid additives for the oil and gas industry. The asphalt compositions according to the present invention can in addition to the pavement and mastic applications also be applied in other current and future outlets of asphalt such as but not limited to: hydraulics and erosion control; catchment areas, basins; dam groutings, dam linings, protection; dyke protection, ditch linings; drainage gutters, structures; embankment protection; groynes; jetties; levee protection; mattresses for levee & bank protection; membrane linings, waterproofing; reservoir linings; roofing; electrical products; revetments; sand dune stabilization; sewage lagoons, oxidation ponds; swimming pools; waste ponds; water barriers, paints and enamels and backed felts.

In addition the asphalt composition according to the present invention may comprise one or more additives. Some of the potential additives have already been mentioned, such as polymers and rejuvenating agents. Other additives include adhesion promoters, such as amine compounds, lime and calcium hydroxide, anti-drainage additives, such as cellulose fibers, glass fibers and rock wool, and dyes, such as iron oxide, natural or synthetic zeolites as viscosity modifying agents, emulsifiers, stabilizers, antioxidants and mixtures of any of these compounds. A particularly suitable additive is filler consisting of calcium carbonate and/or calcium hydroxide. The filler suitably has a diameter of at most 0.2 mm. A preferred filler is limestone.

The amount of each of the additives in the asphalt composition is suitably in the range of 0.2 to 6.0% wt, preferably from 1.0 to 5.0% wt, based on the asphalt composition. Preferably, the additive or additives are present in an amount in the range of 0.2 to 6.0% wt each, based on the asphalt composition.

The asphalt compositions according to the present invention have advantageous properties. The asphalt compositions are shown to have an indirect tensile strength of at least 1.5 MPa, as determined in accordance with EN 12697-12. This is the tensile strength of the composition when it is measured as a dry composition. When the asphalt composition is kept under water at 40° C. and the indirect tensile strength of the sample is then determined, the value is decreased, but is still retained at a sufficiently high level. The level may even be higher than the indirect tensile strength of conventional asphalt compositions that comprise bitumen as binder material.

An interesting property of road pavement is the sensitivity to water, in particular the property of retaining the tensile strength after exposure to wet conditions. Thereto the industry has developed the indirect tensile strength ratio. By the indirect tensile strength ratio (ITSR) is understood the ratio of the indirect tensile strength determined under wet conditions divided by the indirect tensile strength determined under dry conditions. This indirect tensile strength ratio may for example be at least 0.75. More suitably the ITSR is reported as percentage. It has been found that the asphalt compositions according to the invention not only show an excellent absolute value of tensile strength, but that the asphalt compositions also have an ITSR of at least 75%, preferably at least 80%, more preferably at least 85%, as determined in accordance with EN 12697-23. Typically the maximum ITSR is 100%, more typically 98%. It has been found that the ITSR of asphalt compositions that contain a mixture of bitumen and humins as binder material, is increased when the humins content is also enhanced.

It was also surprising that the asphalt compositions according to the present invention show a remarkably low swelling when exposed to moisture. That is very surprising, as humins tend to have polar groups, such as the furan ring, hydroxymethylfuryl groups, and optionally other hydroxyl and carboxylic moieties, as described above. In spite of these polar groups, the affinity towards water is not such that it causes swelling. In fact, the swelling of the asphalt composition according to the present invention is less than the swelling of conventional bituminous asphalt. The swelling of the asphalt compositions according to the present invention has been determined before and after vacuum impregnation. The asphalt compositions according to the present invention suitably have a swelling of at most 1.0%, as determined in accordance with EN 12697-12, preferably at most 0.5%.

As indicated above, binder materials that comprise bitumen and humins have advantageous properties. Accordingly, the present invention also provides binder material for use in asphalt compositions comprising from 1 to 95% wt, preferably from 5 to 60% wt of humins, based on the weight of the binder material. The other component or components in the binder material may be selected from all conventional binder materials. Preferably, the binder material further comprises from 99 to 5% wt, preferably from 95 to 40% wt of bitumen, based on the weight of the binder material. The bitumen may be a relatively hard bitumen grade. It is also possible to use reclaimed bitumen. It is also possible to use polymer-modified bitumen as described above. In order to increase the sustainability of the binder material, it may also contain lignin. The lignin may be instead of bitumen or in addition to bitumen. The content of lignin in such binder material is preferably from 0.5 to 60% wt, preferably from 1 to 20% wt, based on the weight of the humins, bitumen and lignin in the binder material.

The present invention also provides the use of humins in the manufacture of binder material for asphalt compositions. It further provides the use of humins as binder material in asphalt compositions.

The invention will be further illustrated by means of the following examples.

EXAMPLE 1

Two open-graded asphalt compositions were prepared by mixing 16% wt or 33% wt of humins with a bitumen grade 40/60 to obtain a binder material. The humins were obtained during the dehydration of glucose in methanol. The humins had a penetration of 50 dmm. The binder material was mixed with coarse aggregates, fines aggregates (sand) and filler, viz. calcium hydroxide in amounts indicated in Table 1. For comparison reasons similar asphalt compositions were prepared using only bitumen (of grade 70/100) and using a 50/50 m/m mixture of bitumen and lignin. The aggregate mixtures for all four asphalt compositions contained 85 parts by weight (pbw) coarse aggregates, 11 pbw fine aggregates and 4 pbw calcium hydroxide filler. 100 Pbw of this aggregate mixture were mixed with 4.5 pbw of binder material.

The four compositions obtained were subjected to indirect tensile strength test in accordance with EN 12697-12 in triplicate. The durability and resistance of slices of these four asphalt compositions were determined by the indirect tensile strength test before and after water exposure. The change of indirect tensile strength is checked from six samples: three dry samples and three samples which have been exposed to water. During the indirect tensile strength test, the sample is attached between two load stripes and is loaded radially at a speed of 50 mm/min. The maximum load at fracture is measured. The relation of the strength values before and after water storage is determined, and called Indirect Tensile Strength Ratio (ITSR). The average values of the three indirect tensile strength (ITS) measurements and the ITSR of the average values are reported in Table 1.

Further the swelling of the compositions was measured also using EN 12697-12 where the measurements were done before and after vacuum impregnation.

TABLE 1

|  | Composition 1 | Composition 2 | Composition 3 | Composition 4 |
| --- | --- | --- | --- | --- |
| Binder | 16% wt humins 84% wt bitumen | 33% wt humins 67% wt bitumen | 100% wt bitumen | 50% wt lignin 50% wt bitumen |
| ITS dry, MPa | 1.42 | 1.58 | 1.06 | 1.34 |
| ITS wet, MPa | 1.12 | 1.20 | 0.85 | 1.09 |
| ITSR, % | 79 | 76 | 80 | 81 |
| Swelling, % | 0.5 | 0.5 | 1.59 | 0.07 |

These results show that when the humins-containing asphalt compositions according to the invention are applied as open-graded asphalt compositions, the indirect tensile strength of the open-graded asphalt compositions is far better than the strength of conventional bitumen-based asphalt compositions or lignin-containing asphalt compositions. The ITSR values are in the same order of magnitude. The swelling of the humins-containing asphalt composition is significantly better than the swelling behavior of conventional asphalt comprising bitumen as sole binder material, and comparable to the swelling of the lignin-containing asphalt composition.

EXAMPLE 2

The binder materials that were used for the four compositions of Example 1 were also used for the manufacture of stone mastic asphalt. Stone mastic asphalt (SMA) typically has a higher content of binder material than open-graded asphalt. The contents of the various components in the four SMA compositions were as follows: 71% wt coarse aggregates, 15% wt fine aggregates, 7.5% wt calcium carbonate filler and 6.5% wt of binder material.

The four SMA compositions were subjected to the same tests as those described in Example 1. The results are shown in Table 2.

TABLE 2

|  | Composition 5 | Composition 6 | Composition 7 | Composition 8 |
| --- | --- | --- | --- | --- |
| Binder | 16% wt humins 84% wt bitumen | 33% wt humins 67% wt bitumen | 100% wt bitumen | 50% wt lignin 50% wt bitumen |
| ITS dry, MPa | 2.88 | 3.27 | 1.27 | 1.78 |
| ITS wet, MPa | 2.41 | 2.95 | 1.21 | 1.51 |
| ITSR, % | 84 | 90 | 95 | 85 |
| Swelling, % | 0.6 | 0.4 | 0.9 | 0.3 |

These results show that the asphalt compositions according to the present inventions are excellently suitable as SMA compositions. The strength of these compositions is impressive, both before and after exposure to water. Also the swelling behavior is improved compared to the conventional bitumen-comprising asphalt composition of Composition 7.

The invention claimed is:

1. An asphalt composition comprising aggregates and a binder material, wherein the binder material comprises humins, which humins are characterized by furan rings connected via alkylene moieties and comprise carbonaceous water-insoluble by-products of the dehydration of carbohydrates and/or 5-hydroxymethylfurfural and/or ethers or esters of 5-hydroxymethylfurfural.

2. The asphalt composition according to claim 1, wherein the humins comprise carbonaceous water-insoluble by-products of the dehydration of carbohydrates in the presence of an alcohol.

3. The asphalt composition according to claim 1, wherein the humins comprise a network of furan rings linked by ether and acetal bonds.

4. The asphalt composition according to claim 1, wherein the binder material comprises from 5 to 80 % wt of humins, based on the weight of the binder material.

5. The asphalt composition according to claim 1, wherein the binder material comprises bitumen, in addition to humins.

6. The asphalt composition according to claim 5, wherein the bitumen is selected from the grades 20/30, 30/45, 35/50, 40/50, 40/60, 50/70 and 60/70.

7. The asphalt composition according to claim 5, wherein the binder material comprises from 1 to 90% wt of bitumen, based on the amount of humins and bitumen.

8. The asphalt composition according to claim 1, wherein the binder material comprises lignin, in addition to humins.

9. The asphalt composition according to claim 8, wherein the weight ratio of humins to lignin is at most 1:2.

10. The asphalt composition according to claim 1, wherein the asphalt composition comprises one or more additives.

11. The asphalt composition according to claim 10, wherein the additive has been selected from the group consisting of polymers, rejuvenating agents, adhesion promoters, lime, calcium hydroxide, anti-drainage additives, dyes, natural zeolites, synthetic zeolites, emulsifiers, stabilizers, anti-oxidants and mixtures of any of these compounds.

12. The asphalt composition according to claim 1, wherein the aggregates comprise aggregates with a diameter of at most 2 mm.

13. The asphalt composition according to claim 1, which has an indirect tensile strength of at least 1.5 MPa, as determined in accordance with EN 12697-12.

14. The asphalt composition according to claim 1, which has an indirect tensile strength ratio of at least 0.75.

\* \* \* \* \*